Patented Mar. 17, 1931

1,797,210

UNITED STATES PATENT OFFICE

ALEX BROOKING DAVIS, OF CINCINNATI, OHIO, ASSIGNOR, BY MESNE ASSIGNMENTS, TO KEYSTONE WATCH CASE CORPORATION, OF RIVERSIDE, NEW JERSEY, A CORPORATION OF PENNSYLVANIA

PROCESS OF AND PRODUCT FOR PHOTOGRAPHIC ETCHING

No Drawing.  Application filed December 16, 1926.  Serial No. 155,337.

This invention relates to novel improvements in the art of photography, and it has particularly to do with a photographic film which has special advantages when used in the process of etching. The invention also pertains to a novel process of preparing the film and to the process of using and treating the film when employed, for instance, in etching and similar work.

In a copending application entitled Process of and product for photographic etching, filed December 16, 1926, S. N. 155,336, directed to improvements in the detail of that process described by E. Valenta of Vienna, Austria, in Photographische Korrespondenz, 1910, pages 238–40 where Valenta makes a light sensitive resist for photo etching by reacting upon asphalt with sulfur chloride, Valenta adding the sulfur chloride solution very slowly, while my improvements call for the immediate addition of the entire quantity necessary for the reaction, which is approximately eight percent of the weight of the asphalt. Also, in my copending application, I have further improved the quality of the resist by washing it in film form with ether after its application to the surface to be etched. I have now found that this step may be advantageously carried out on the basic substance, thereby shortening the detail of operation by removing the ether soluble portion from the resist en masse.

This process may be carried out in detail as follows:—To 25 grams of any ordinary asphalt, dissolved in 150 cc. carbon bisulphide, 2 grams of sulfur chloride dissolved in 8 cc. carbon bisulphide is added all at once, and the reaction allowed to proceed at the boiling point of the solvent until it has gone to practical completion. The balance of the carbon bisulphide which can be removed at water bath temperature is then driven off and there is then added 500 cc. of ethyl ether and the mass thoroughly shaken. There dissolves in the ether the more soluble portion of the asphaltic material, and this solvent action of the ether is selective so far as light sensitivity is concerned, the material which goes into solution being the least light sensitive. The ether is now decanted from the black, semi-solid residue and the final portion of ether driven off on the water bath. The residue is then dissolved in 150 cc. of benzol and this solution filtered from a small portion of insoluble matter. This benzol solution now constitutes the resist, which is ready for application to the surface to be etched. Designs borne by a glass screen, or otherwise, are interposed between an arc fitted with a suitable condenser and the surface bearing the resist, and the designs are projected on the resist, the portions of the resist not rendered insoluble by the action of light are removed by a solvent including turpentine, and the etching may be accomplished by known processes.

From experiments, I have found that Valenta's process is somewhat difficult to use practically on account of ununiform results, the details which I have added so far perfect the Valenta process that entirely uniform results are obtained using practically any kind of soft commercial asphalt, such as Trinidad or Mexican asphalt. What I believe to be novel improvements on Valenta's process are the steps in the process detail of adding the carbon bisulphide solution of sulfur chloride to the asphalt all at once, since under these conditions the reaction seems to take an entirely different and more highly desirable course than when added as directed by Valenta, and also the step of removing the ether soluble portions of the resulting reaction product of the mass as described instead of from the film after deposition as in my copending application.

I have further found that this process detail is applicable to other organic substances than asphalt, for if the process be carried out exactly as described, but using pine resin in place of asphalt, a resist suitable for photo etching is obtained, and I do not therefore restrict the application of this process detail to asphalt alone, nor to the use of ether as the solvent, as other solvents of an ethereal character, such as methyl ethyl ether, will serve the purpose; and in fact, any solvent capable of removing the undesirable portion of the reaction mass I regard as falling within the scope of this invention.

Ordinary asphalt yields colloidal solutions, as do also its reaction products with sulfur chloride, and the sulfur chloride apparently both chlorinates and sulfurizes the various asphaltic ingredients, yielding products which are not only light sensitive, but others which act as catalysts or accelerators for the light sensitive portion. The ultimate film, therefore, consists of a hydrophobic colloid including sensitizers or catalysts. The sensitivity is still further increased as directed by Valenta by the addition of 2% of oil of lavender, this oil being high in aldehydes which apparently act in a catalytic manner as well as by direct condensation for increasing the light sensitivity of the film.

It is evident from the above that my resist consists of hydrophobic colloids including catalysts and sensitizers therefor and the process detail as above described has so far increased the value of asphalt as a photographic resist that it is thoroughly practical for use in plant operations being stable for at least six weeks without deterioration and capable of being rendered insoluble by light exposure with ordinary arc projection machines in less than one minute, and I have obtained good pictures in 15 seconds which have withstood the action of an electrolyte etching bath for 30 minutes. These results are a great improvement over the results obtained by other researchers.

It is to be understood that the foregoing description of the improved resist and the process of use thereof may be varied to some extent, but such variations and changes as may be desired are considered as being within the scope of the invention as would be permitted by the broad interpretation of the following claims.

A divisional application, Serial No. 318,312 for process of and product for etching has been filed on November 9, 1928.

What I claim is:—

1. A process of preparing a photographic resist which consists in treating a hydrophobic colloid with a sensitizer, comprising a solution of sulphur chloride in carbon bisulphide in a single step, removing the solvent, washing the hydrophobic colloid so treated with an ether to increase the sensitivity of the sensitized hydrophobic colloid to light, and dissolving in benzol.

2. A process of preparing a photographic resist which consists in treating a hydrophobic colloid with sulphur chloride dissolved in carbon bisulphide in a single step, and removing the solvent; washing the hydrophobic colloid so treated with an ether to dissolve the light-insensitive portions and removing the so-formed etheral solution whereby to increase the sensitivity of the sensitized hydrophobic colloid to light, dissolving in benzol, and adding an aldehyde to the solution.

3. A process of preparing a photographic resist which consists in treating asphalt in a single step with a carbon bisulphide solution of a sulphur halide, and removing the solvent, washing the asphalt so treated with ether to dissolve the light insensitive portions and removing the ether solution whereby to increase the sensitivity of the asphalt to light, and dissolving in benzol.

4. A process of preparing a photographic resist which consists in treating asphalt in a single step with a solution of sulphur chloride in carbon bisulphide, removing the carbon bisulphide, and washing the asphalt so treated with an ether whereby to dissolve the light insensitive portions, removing the so-formed ethereal solution to increase the sensitivity of the asphalt to light, dissolving in benzol, and adding two per cent of oil of lavender.

5. In the process of preparing a photographic resist, the steps of dissolving a hydrophobic colloid in carbon bisulphide, adding at one time the full requirement of sulfur chloride, and after reaction removing the carbon bisulphide and treating the residue with a medium of ethereal character to dissolve light insensitive portions thereof and removing the so-formed solution.

6. In the process of preparing a photographic resist, the steps of dissolving a hydrophobic colloid in carbon bisulphide, adding at one time the full requirement of sulfur chloride, and after reaction removing the carbon bisulphide and treating the residue with ether to dissolve light insensitive portions thereof and removing the so-formed solution.

7. In the process of preparing a photographic resist, the steps of dissolving asphalt in carbon bisulphide, adding sulfur chloride, heating to remove the carbon bisulphide, and treating the remaining residue with a medium of ethereal character to dissolve light insensitive portions thereof, and removing the so-formed ethereal solution.

8. In the process of preparing a photographic resist, the steps of dissolving asphalt in carbon bisulphide, adding at one time the full requirement of sulfur chloride, removing the carbon bisulphide and treating the remaining residue with a medium of ethereal character to dissolve light insensitive portions thereof, removing the ethereal solution, and dissolving the residue in benzol.

9. The process of preparing a photographic resist which consists in adding at one time to a carbon bisulphide solution of a hydrophobic colloid the full requirement of sulfur chloride, heating to remove substantially all of the carbon bisulphide, treating the residue with a medium of ethereal character, decanting to remove the medium and the soluble portions of the residue dissolved therein, and dissolving the residue in benzol.

10. The process of preparing a photographic resist which consists in adding at one time to a carbon bisulphide solution of a hydrophobic colloid the full requirement of sulfur chloride, heating to remove substantially all of the carbon bisulphide, treating the residue with a medium of ethereal character, and filtering to remove the so-formed solution.

11. The process of preparing a photographic resist which consists in dissolving asphalt in carbon bisulphide, adding at one time the full requirement of sulfur chloride, heating to remove substantially all of the carbon bisulphide, treating the residue with ether, decanting to remove the ether and the portions of the residue dissolved therein, and dissolving the residue in benzol.

12. The process of preparing a photographic resist which consists in dissolving asphalt in carbon bisulphide, adding at one time the full requirement of a relatively small portion of sulfur chloride dissolved in a small quantity of carbon bisulphide, heating the solution at the boiling point of the solvent until substantially all of the carbon bisulphide is removed, adding a relatively large amount of ethyl ether, shaking the mixture thoroughly, decanting the ether solution, heating to remove the remaining ether, dissolving the residue in benzol, and filtering.

13. A photographic medium being a sulfurized and chloridized asphalt which has been treated with an ether for removing light insensitive portions thereof and which has an aldehyde incorporated therein.

14. A photographic medium being a sulfurized and chloridized asphalt which has been treated with ether for removing light insensitive portions thereof and which has oil of lavender incorporated therein.

This specification signed this 10th day of December, 1926.

ALEX BROOKING DAVIS.